US012606186B2

(12) United States Patent
Kunberger

(10) Patent No.: US 12,606,186 B2
(45) Date of Patent: Apr. 21, 2026

(54) METHOD FOR OPERATING A DRIVER ASSISTANCE SYSTEM OF A VEHICLE, COMPRISING DRIVER MODERATION FOR PARTIALLY-AUTOMATED FUNCTIONS, DRIVER ASSISTANCE SYSTEM, AND VEHICLE

(71) Applicant: Bayerische Motoren Werke Aktiengesellschaft, Munich (DE)

(72) Inventor: Jan-Mark Kunberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 496 days.

(21) Appl. No.: 17/917,290

(22) PCT Filed: Mar. 31, 2021

(86) PCT No.: PCT/EP2021/058504
§ 371 (c)(1),
(2) Date: Oct. 6, 2022

(87) PCT Pub. No.: WO2021/204632
PCT Pub. Date: Oct. 14, 2021

(65) Prior Publication Data
US 2023/0192114 A1 Jun. 22, 2023

(30) Foreign Application Priority Data
Apr. 7, 2020 (DE) ..................... 10 2020 109 666.6

(51) Int. Cl.
*B60W 50/10* (2012.01)
*B60W 30/165* (2020.01)
(Continued)

(52) U.S. Cl.
CPC .......... *B60W 50/10* (2013.01); *B60W 30/165* (2013.01); *B60W 30/18163* (2013.01); *B60W 50/14* (2013.01); *B60W 60/0015* (2020.02)

(58) Field of Classification Search
CPC .............. B60W 50/10; B60W 30/165; B60W 30/18163; B60W 50/14; B60W 60/0015;
(Continued)

(56) References Cited

U.S. PATENT DOCUMENTS 9,056,616 B1 * 6/2015 Fields .................. G09B 19/167
9,129,460 B2 * 9/2015 McClellan ............. G07C 5/085
(Continued)

FOREIGN PATENT DOCUMENTS

CN 108473144 A 8/2018
CN 109177982 A 1/2019
(Continued)

OTHER PUBLICATIONS

International Search Report (PCT/ISA/210) issued in PCT Application No. PCT/EP2021/058504 dated Jul. 12, 2021 with English translation (four (4) pages).
(Continued)

*Primary Examiner* — Peter D Nolan
*Assistant Examiner* — Demetra R Smith-Stewart
(74) *Attorney, Agent, or Firm* — Crowell & Moring LLP

(57) ABSTRACT

Methods and systems are provided for operating a driver assistance system of a vehicle. A plurality of partially automated functions are performed using the driver assistance system during operation of the vehicle. In the partially automated functions, longitudinal guidance and/or transverse guidance of the vehicle are and/or is regulated, and/or information that describes surroundings of the vehicle is output and/or a signal is output to the surroundings using the driver assistance system. Following a predetermined number
(Continued)

of performed partially automated functions, a moderation signal is output to a driver of the vehicle for a following function that can be performed in a partially automated manner using the driver assistance system. When the moderation signal is output, the driver is asked for feedback regarding the following function.

8 Claims, 2 Drawing Sheets

(51) Int. Cl.
| | | |
|---|---|---|
| *B60W 30/18* | (2012.01) | |
| *B60W 50/14* | (2020.01) | |
| *B60W 60/00* | (2020.01) | |

(58) Field of Classification Search
CPC ....... B60W 2540/215; B60W 2540/30; B60W 60/001; B60Q 1/346
See application file for complete search history.

(56) References Cited

U.S. PATENT DOCUMENTS

| | | | | |
|---|---|---|---|---|
| 10,599,155 B1 * | 3/2020 | Konrardy | ............... | G06N 3/045 |
| 10,783,587 B1 * | 9/2020 | Augustine | ............. | G06Q 40/08 |
| 11,441,916 B1 * | 9/2022 | Konrardy | ............. | G01C 21/343 |
| 11,654,919 B2 * | 5/2023 | Khayyer | ............... | B60K 35/654 |
| | | | | 701/36 |
| 2012/0083947 A1 * | 4/2012 | Anderson | ............. | G08G 1/166 |
| | | | | 701/1 |
| 2017/0220039 A1 * | 8/2017 | Funakawa | ............. | B60W 50/14 |
| 2018/0029610 A1 | 2/2018 | McNew | | |

| | | | | |
|---|---|---|---|---|
| 2018/0322782 A1 * | 11/2018 | Engel | ..................... | G08G 1/163 |
| 2019/0202478 A1 | 7/2019 | Gruchalski | | |
| 2019/0339695 A1 | 11/2019 | Feron et al. | | |
| 2020/0317216 A1 * | 10/2020 | Konrardy | ........... | B60W 30/182 |
| 2022/0244736 A1 * | 8/2022 | Konrardy | ............... | G06Q 40/08 |
| 2023/0182759 A1 * | 6/2023 | Wright | .................. | B60W 40/09 |
| | | | | 701/24 |

FOREIGN PATENT DOCUMENTS

| | | | |
|---|---|---|---|
| CN | 109476321 A | | 3/2019 |
| DE | 10 2005 052 634 A1 | | 5/2007 |
| DE | 10 2014 216 272 A1 | | 2/2016 |
| EP | 3 125 211 A1 | | 2/2017 |
| EP | 3 543 082 A1 | | 9/2019 |
| JP | 2017-193210 A | | 10/2017 |

OTHER PUBLICATIONS

German-language Written Opinion (PCT/ISA/237) issued in PCT Application No. PCT/EP2021/058504 dated Jul. 12, 2021 (seven (7) pages).

German-language Search Report issued in German Application No. 10 2020 109 666.6 dated Jan. 20, 2021 with partial English translation (12 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages.

Chinese-language Office Action issued in Chinese Application No. 202180025742.8 dated Feb. 28, 2025 with partial English translation (16 pages).

* cited by examiner

METHOD FOR OPERATING A DRIVER ASSISTANCE SYSTEM OF A VEHICLE, COMPRISING DRIVER MODERATION FOR PARTIALLY-AUTOMATED FUNCTIONS, DRIVER ASSISTANCE SYSTEM, AND VEHICLE

BACKGROUND AND SUMMARY OF THE INVENTION

The present subject matter relates to a method for operating a driver assistance system of a vehicle. The present subject matter furthermore relates to a driver assistance system for a vehicle and to a vehicle having such a driver assistance system.

Various driver assistance systems for vehicles are known from the prior art. The interest here is in particular in driver assistance systems that allow partially automated functions or driving maneuvers. At this automation level, in accordance with Level 2 of the SAE J3016 standard, the driver assistance system is for example able to take over the longitudinal guidance and/or the transverse guidance of the vehicle, but the driver still remains responsible. Driver assistance systems in accordance with Level 2 relieve the driver from monotonous driving tasks. The availability and the performance of these driver assistance systems are however not guaranteed in all situations. In order to guarantee the safety of these systems, monitoring by the driver is therefore necessary.

There is also a relationship between the performance of the driver assistance system and a degree of trust in automation that the driver builds up when using the driver assistance function. As the performance of the driver assistance system increases, in rare cases, there is the risk of the driver building up a high degree of trust and monitoring the driver assistance function or the performance of the partially automated driving maneuver only to a limited extent. Since the efficiency is also dependent on the local situation, in rare cases, there is the possibility of the driver, who regularly travels the same route, experiencing increased functional performance on this route and therefore building up an increased degree of trust in automation due to the absence of driver moderation.

One object of the present subject matter is to disclose a solution as to how a driver assistance system of the type mentioned at the outset, which allows partially automated functions, is able to be operated more safely.

This object is achieved, according to the present subject matter, by a method, by a driver assistance system and by a vehicle having the features according to the independent claims. Advantageous developments of the present subject matter are given in the dependent claims.

A method according to the present subject matter is used to operate a driver assistance system of a vehicle. The method comprises performing a plurality of partially automated functions by way of the driver assistance system during operation of the vehicle. In these partially automated functions, longitudinal guidance and/or transverse guidance of the vehicle are and/or is regulated by way of the driver assistance system. As an alternative or in addition, in the partially automated functions, information that describes surroundings of the vehicle may be output and/or a signal may be output to the surroundings by way of the driver assistance system. Provision is furthermore made, following a predetermined number of performed partially automated functions, for a moderation signal to be output to a driver of the vehicle for a following function that is able to be performed in a partially automated manner by way of the driver assistance system. When the moderation signal is output, the driver is asked for feedback regarding the following function.

By way of example, partially automated driving maneuvers may be performed as the partially automated functions during operation of the vehicle by the driver assistance system. When performing these partially automated driving maneuvers, the vehicle is operated in accordance with Level 2 of the SAE J3016 standard. During the driving maneuvers, the surroundings or the environment of the vehicle may be detected based on measurements by corresponding surroundings sensors of the driver assistance system. Steering maneuvers, braking maneuvers and/or acceleration maneuvers may then be performed based on the detected environment. Provision is in particular additionally made for the human driver to monitor the performance of the driving maneuvers such that he is able to intervene if necessary.

The driver assistance system may furthermore provide one or more items of information about the surroundings of the vehicle in the partially automated functions. By way of example, objects or other road users detected in the surroundings may be displayed to the driver using an information system. Provision may furthermore be made for planned partially automated driving maneuvers, such as for example a planned lane change, to be displayed to the driver by way of the information system. Signals for the surroundings may furthermore be generated in a partially automated manner. Such a signal may be output as a light signal, for example by a direction indicator of the vehicle. For future applications, provision may also be made for acoustic signals and/or optical signals to be output to the surroundings in a partially automated manner by a display or the like. These signals may in particular be used to ensure safety-relevant behavior of the surroundings. By way of example, information that describes that the vehicle is currently stopped and is waiting may be output to pedestrians or other road users as signal. This outputting of a signal to the surroundings may be announced to the driver beforehand.

According to the present subject matter, provision is made for a check to be performed as to whether a predetermined number of partially automated functions has already been performed by the driver assistance system. A check may in particular be performed as to whether a predetermined number of high-performance partially automated functions has been performed. A high-performance partially automated function should in this case in particular be understood to mean that the partially automated function was performed with a particular performance, for example 90%. The performance may in this case describe an efficiency and/or functional capability of the driver assistance system during the performance of the partially automated function. When this predetermined number of performed functions is reached, driver moderation may be requested for the following function. The following function is for example a driving maneuver that is able to be performed in a partially automated manner by the driver assistance system. In order to request the driver moderation, the moderation signal may be emitted and the driver may be asked to give feedback regarding the following driving maneuver.

As was already explained at the outset, in rare cases, the situation may arise whereby the driver, following multiple partially automated driving maneuvers or functions performed with high performance, builds up a significant degree of trust in automation. This means in particular that the driver trusts that the partially automated function is performed safely by the driver assistance system. In rare cases, this may have the consequence that the driver does not monitor the partially automated function sufficiently and/or is potentially inattentive. Provision is therefore made, according to the present subject matter, for the driver attentiveness to be moderated by the driver assistance system such that the driver does not build up a significant degree of trust in automation. The driver is intended to regularly experience the functional limits of the driver assistance system. To ensure this, the driver assistance system, following the predetermined number of high-performance partially automated functions or driving maneuvers, may offer at least one function that is not able to be experienced in a high-performance manner for the driver. The driver attentiveness is thus able to be moderated better, even in the case of high functional performance of the driver assistance system. In relation to the information that describes the surroundings of the vehicle and signals that are output to the surroundings as well, the method according to the present subject matter makes it possible to prevent the driver from building up an excessive degree of trust. The operation of the driver assistance system or the performance of the partially automated functions may thus take place more safely overall.

In one example, when the moderation signal is output, the driver is asked for confirmation for the following function to be performed in a partially automated manner by the driver assistance system. As the feedback regarding the following function, the driver may thus be asked for the confirmation. In other words, the driver may be asked to manually confirm the automatic regulation of the driver assistance function. The confirmation may be performed by the driver, in particular manually. By way of example, the driver may be asked to activate a corresponding operator input on a control element in a passenger compartment of the vehicle or the like. Provision may also be made for this operator input to take place through a voice input and/or through a gesture.

Provision may furthermore be made for the driver to be asked to actuate or to touch one of the pedals of the vehicle. By way of example, the driver may be asked to actuate or to tap the brake pedal for the confirmation. After the confirmation has been given by the driver or has been detected, the following function, and in particular the following driving maneuver, may then be performed in a partially automated manner by the driver assistance system. The attentiveness of the driver may thereby be increased and the buildup of a significant degree of trust in automation may be prevented.

In one alternative example, when the moderation signal is output, the driver may be asked to perform the following function manually. Even when the following function could actually be performed in a partially automated manner by the driver assistance system, the driver may be asked by the driver assistance system to perform the following function manually. Provision may in particular be made for the driver to be asked to perform a driving maneuver manually. Provision may also be made for the driver to be informed about an unavailability by way of the driver assistance system. The fact that partially automated performance of the following function is not possible or is not available, even though the driver assistance system could actually perform the function in a partially automated manner, may thus be displayed to the driver. For this purpose, a corresponding indication may be output to the driver as a result of the emission of the moderation signal. The driver may thus be offered a functional situation that does not exhibit high performance. Provision may also be made for the partially automated function or the partially automated driving maneuver to be absent without previous information or without announcement. In other words, the function may spontaneously be unavailable without announcement. This means in particular that the function is absent without a corresponding display. This thus makes it possible to prevent the driver relying on an unavailability display. Such moderation has a very high degree of demanding character.

In the case of driver assistance systems in accordance with Level 2, it is also possible to prevent an excessively high degree of trust being built up in the information systems for providing the information about the surroundings. In this connection, artificial system limits may also be used for such an information system. The information system may preferably be designed such that it does not display, at least regularly (in a manner clearly recognizable for the driver), safety-critical information, for example a display of following traffic. By way of example, following a particular number of lane change situations, following traffic might not be displayed by way of the information system. Provision may also be made for planned driving maneuvers no longer to be displayed.

The outputting of signals to the surroundings may also in some cases be safety-critical. By way of example, the automatic outputting of light signals by way of a direction indicator or indicator light may be safety-critical. The driver could thus for example rely on the driver assistance system also always deactivating the indicator light following the lane change. The lack of deactivation of an indicator light is safety-relevant ahead of an intersection, for example. This may be extended in principle to all information given to the surroundings that is used to ensure a safety-relevant behavior of the surroundings.

It is furthermore advantageous for the number to be predetermined on the basis of a previously determined risk profile of the driver. A risk profile may thus be ascertained during operation of the vehicle. This risk profile may basically describe whether the driver is more cautious or whether the driver is more prepared to take risks. If the driver is more prepared to take risks, the number may be selected to be lower than in the case of a cautious or hesitant driver. This risk profile may also be determined in each case for different drivers of the vehicle. The risk profile may be determined on the basis of a driving behavior of the driver or on the basis of driving maneuvers performed manually by the driver. By way of example, it may be taken into consideration here whether the driver is exhibiting hesitant driving behavior or sporty driving behavior. The driver moderation may thereby be performed individually or in a manner tailored to the driver.

In order to determine the risk profile of the driver, interventions performed by safety systems of the vehicle during manual operation by the driver may also be taken into consideration. Such safety systems may be an emergency braking system, a front protection system, a right of way warning system or stabilization systems, such as ABS and/or DSC. By way of example, braking interventions performed by the safety systems, steering interventions performed by the safety systems, output warnings or the like may be taken into consideration. If increasing interventions are taken by the safety systems, the driver may be assumed to be more prepared to take risks. It may also be taken into consideration whether the driver intervenes manually during partially automated driving maneuvers. If the driver himself intervenes, it may be assumed that the driver is attentive and is not prepared to take risks and/or has a low degree of trust in automation. In this case, the number may be selected to be higher.

Provision may also be made for the number to be determined on the basis of the attentiveness of the driver. The driver may be considered to be attentive when he essentially directs his attentiveness toward the road scene. To identify the attentiveness of the driver, a camera may for example be used to detect the gaze direction of the driver. To determine the attentiveness, it may also be taken into consideration whether requests or warnings are output to the driver by the driver assistance system or safety systems. By way of example, a check may be performed as to whether what is known as a hands on request or the like has been output to the driver. The number of such previously output requests may also be taken into consideration here. In this case, the predetermined number may be selected to be greater in the case of an attentive driver than in the case of a more inattentive driver. The driver moderation may thus be tailored individually to the attentiveness requirements of the driver.

In a further example, the number is predetermined on the basis of the complexity and/or criticality of the function and in particular the driving maneuver. In other words, the number may be predetermined on the basis of a type of the driving maneuver. The complexity of the driving situation and/or the traffic situation may be taken into consideration in this case. The environment or the surroundings of the vehicle may also be taken into consideration. By way of example, the number of other road users or objects in the surroundings of the vehicle may be taken into consideration. A complex driving maneuver may be present for example when a multiplicity of other road users are located in the surroundings of the vehicle. The predetermined number may be lower in the case of complex partially automated driving maneuvers than in the case of less complex driving maneuvers. As an alternative or in addition, the criticality or safety-criticality of the performed partially automated driving maneuvers may be taken into consideration. A safety-critical driving maneuver is present for example when the driver assistance system performs emergency braking or regulates the longitudinal acceleration automatically based on the light signals from a traffic light. A critical driving situation may also be present when the vehicle regulates the longitudinal guidance in a partially automated manner on the basis of recognized road signs. The number may be selected to be lower in the case of critical or safety-critical partially automated driving maneuvers than in the case of less safety-critical driving maneuvers. The driver moderation may thus be performed in a situation-dependent manner overall. The natural system limits may furthermore be conveyed to the driver.

In a further example, the number is predetermined on the basis of a performance of the driver assistance system. The performance may in this case also be referred to as functional performance. The performance may describe the efficiency with which or how well the partially automated function and in particular the partially automated driving maneuver is performed by way of the driver assistance system. The performance may in particular be considered to be low when the partially automated driving maneuver or the function was interrupted by the driver assistance system. The performance may also be assumed to be low when a driver intervention took place while performing the driving maneuver or the driver took back control. In contrast thereto, the performance may be assumed to be high when the driving maneuver or the function was performed completely or was finished successfully by way of the driver assistance system. Corresponding counters, using which the number of interventions is able to be determined, may be used to determine the performance.

It may also be taken into consideration here that the driver assistance system improves over time when similar functions or driving maneuvers are performed multiple times. The driver assistance system may thus be assumed to be self-learning. This means in particular that the performance increases when the partially automated functions are performed repeatedly. In the case of high performance, the driver may build up the degree of trust in automation. In order to counteract this aspect, provision is made in particular for the number to be selected to be lower in the case of high performance than in the case of low performance. The number may thus be predetermined on the basis of a functional capability of the driver assistance system in relation to the partially automated functions.

In a further example, the number is predetermined by way of a random generator. Provision may be made for the determination of the number to be performed on the basis of at least one of the abovementioned aspects and additionally on the basis of a random generator or a random number. As an alternative thereto, provision may be made for the number to be predetermined only on the basis of a random generator. When using the random generator, a random number may be determined for example after the engine is started or after the ignition is turned on or off. The number may then be predetermined based on this random number. This makes it possible to prevent for example the driver identifying regularity in the driver moderation.

In a further example, the moderation signal is output if the predetermined number of similar automated functions has been performed and/or the automated functions have been performed on the same route section. The method according to the present subject matter may in particular be used for repetitive partially automated driving maneuvers. Such a repetitive driving maneuver may be present for example when the same driving maneuver is always performed at the same location by way of the driver assistance system on the daily commute. The driver may build up a significant degree of trust in automation in particular in the case of such repetitive or similar partially automated driving maneuvers. The buildup of the degree of trust in automation is able to be reduced by the driver moderation.

A driver assistance system according to the present subject matter for a vehicle is configured to perform a method according to the present subject matter and the advantageous examples thereof. The driver assistance system may be designed to maneuver the vehicle in a partially automated manner. The driving maneuver that is able to be performed by the driver assistance system or the driving function that is able to be provided by the driver assistance system may for example be distance control, lane keep assistance or lane change assistance or the like. The driving maneuver may also be automatic recognition of a traffic light and regulating longitudinal guidance on the basis of a light signal from the traffic light and/or road signs.

The driver assistance system may have a plurality of surroundings sensors by way of which the surroundings of the vehicle are able to be detected. These surroundings sensors may be designed to recognize objects in the surroundings or to determine the distances to the objects. The driver assistance system may additionally have a camera as surroundings sensor, wherein road signs and/or light signals from a light signal installation or traffic light are able to be recognized based on the images from the camera by way of appropriate image processing methods. The driver assistance system may furthermore have a computing apparatus by way of which the sensor data from the surroundings sensors are able to be processed. Control signals for regulating the longitudinal guidance and/or transverse guidance of the vehicle in the partially automated driving maneuvers may also be output by way of the computing apparatus. The driver assistance system may have a driving function apparatus that is driven, by way of the computing apparatus, so as to perform the partially automated driving maneuvers.

The computing apparatus may additionally be used to determine a predetermined number of partially automated functions, following the reaching of which driver moderation is performed. The computing apparatus may additionally be used to output the moderation signal for the driver moderation. The computing apparatus may for example be formed by a controller. Provision may basically be made for the driver assistance system to have multiple computing apparatuses. Parts of the driver assistance system may additionally be arranged outside the vehicle. As explained above, the driver assistance system may be a learning system. In particular in this case, parts of the system, for example a computing apparatus on which an artificial intelligence algorithm is executed, and a database, may be located outside the vehicle.

The driver assistance system may furthermore have an information system for providing an output to the driver. The driver may be asked for feedback regarding the following function by way of the information system. Information that describes the surroundings of the vehicle may furthermore be output to the driver by way of the information system. By way of example, objects and/or road users in the surroundings may be displayed to the driver. The information system may furthermore be used to display driving maneuvers planned by the driver assistance system or future driving maneuvers. The driver assistance system may additionally have a detection apparatus by way of which the feedback from the driver is able to be detected. The driver assistance system may also have a signaling apparatus by way of which signals or information may be output to the surroundings. Such a signal may be output optically and/or acoustically.

A further aspect of the present subject matter relates to a computer program comprising commands that, when the program is executed by a computing apparatus, prompt same to carry out a method according to the present subject matter and the advantageous examples thereof. The present subject matter furthermore relates to a computer-readable (storage) medium comprising commands that, when executed by a computing apparatus, prompt same to carry out a method according to the present subject matter and the advantageous examples thereof.

A vehicle according to the present subject matter comprises a driver assistance system according to the present subject matter. The vehicle may in particular be designed as an automobile.

The preferred examples set forth in relation to the method according to the present subject matter and their advantages apply accordingly to the driver assistance system according to the present subject matter, to the vehicle according to the present subject matter, to the computer program according to the invention and to the computer-readable (storage) medium.

Further features of the present subject matter will become apparent from the claims, the figures and the description of the figures. The features and combinations of features mentioned above in the description, and the features and combinations of features mentioned below in the description of the figures and/or shown on their own in the figures may be used not only in the respectively specified combinations but also in other combinations or on their own without departing from the scope of the present subject matter.

DETAILED DESCRIPTION

Identical or functionally identical elements are provided with the same reference signs in the figures.

Figure 1:
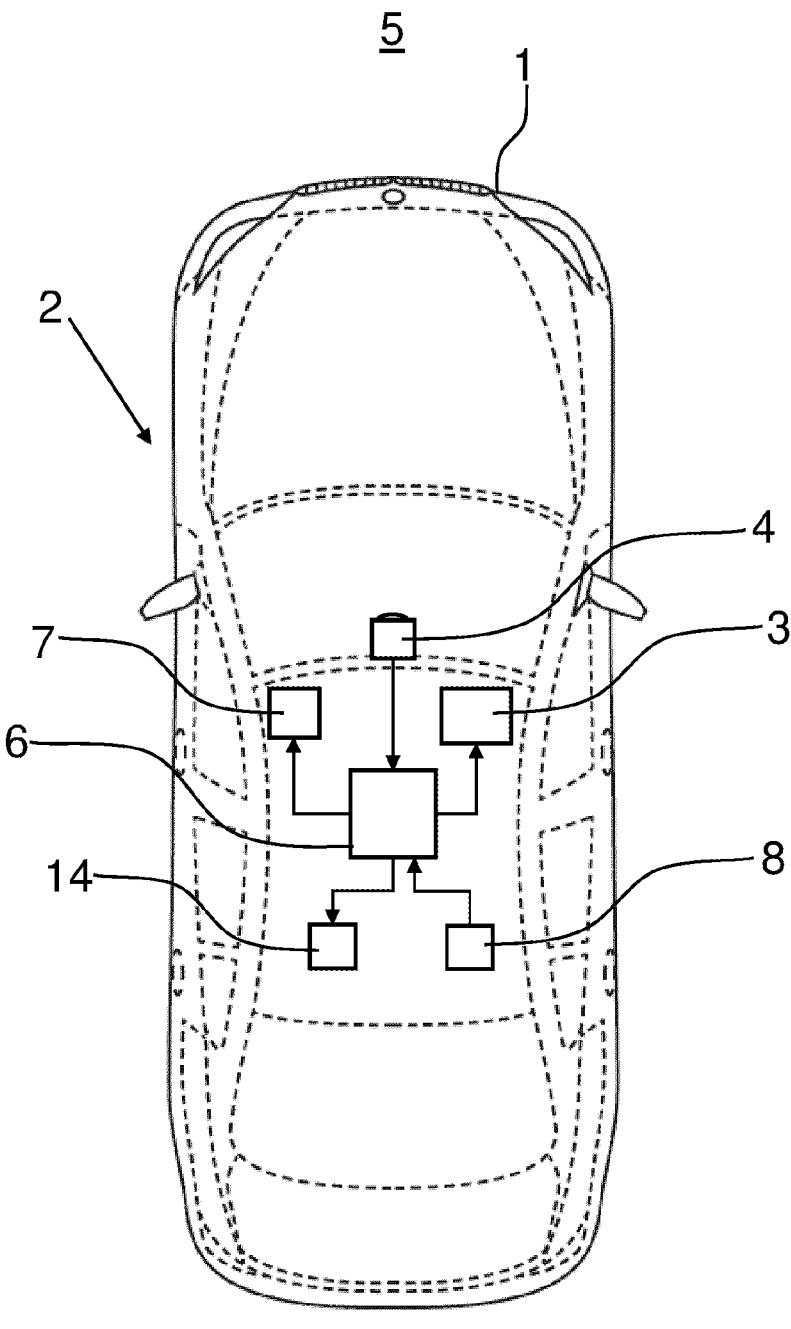
FIG. 1 shows a schematic illustration of a vehicle that has a driver assistance system for performing partially automated functions.

FIG. 1 shows a schematic illustration, in plan view, of a vehicle 1 that is designed here as an automobile. The vehicle 1 comprises a driver assistance system 2 that is used to assist a driver when driving the vehicle 1. Provision is in particular made for the vehicle 1 to be able to be maneuvered in a partially automated or highly automated manner by way of the driver assistance system 2. For this purpose, the driver assistance system 2 comprises a driving function apparatus 3, illustrated only schematically here. A driving function of the driver assistance system 2 is able to be provided by way of the driving function apparatus 3. By way of example, longitudinal guidance and/or transverse guidance of the vehicle 1 may be regulated in a partially automated manner by way of the driving function apparatus 3.

The driver assistance system 2 furthermore comprises at least one surroundings sensor 4, by way of which surroundings 5 of the vehicle 1 are able to be detected. The driver assistance system 2 here comprises, by way of example, a surroundings sensor 4 that is designed as a camera. The driver assistance system 2 may preferably have a plurality of surroundings sensors 4. The surroundings sensor 4 may be used to provide surroundings data or image data and transmit them to a computing apparatus 6 of the driver assistance system 2. The surroundings data may be evaluated by way of the computing apparatus 6. The driver assistance system 2 furthermore comprises an information system 7, by way of which an output is able to be output to the driver of the vehicle 1. In this case, the output may take place optically, haptically and/or acoustically. The driver assistance system 2 furthermore comprises an input apparatus 8, by way of which an operator input from the driver is able to be detected. Information that describes the surroundings 5 and/or planned driving maneuvers may additionally be provided to the driver by way of the information system 7. The driver assistance system 2 furthermore comprises a signaling apparatus 14, by way of which optical and/or acoustic signals are able to be output to the surroundings 5. This signaling to the surroundings 5 may also be announced beforehand.

Figure 2:
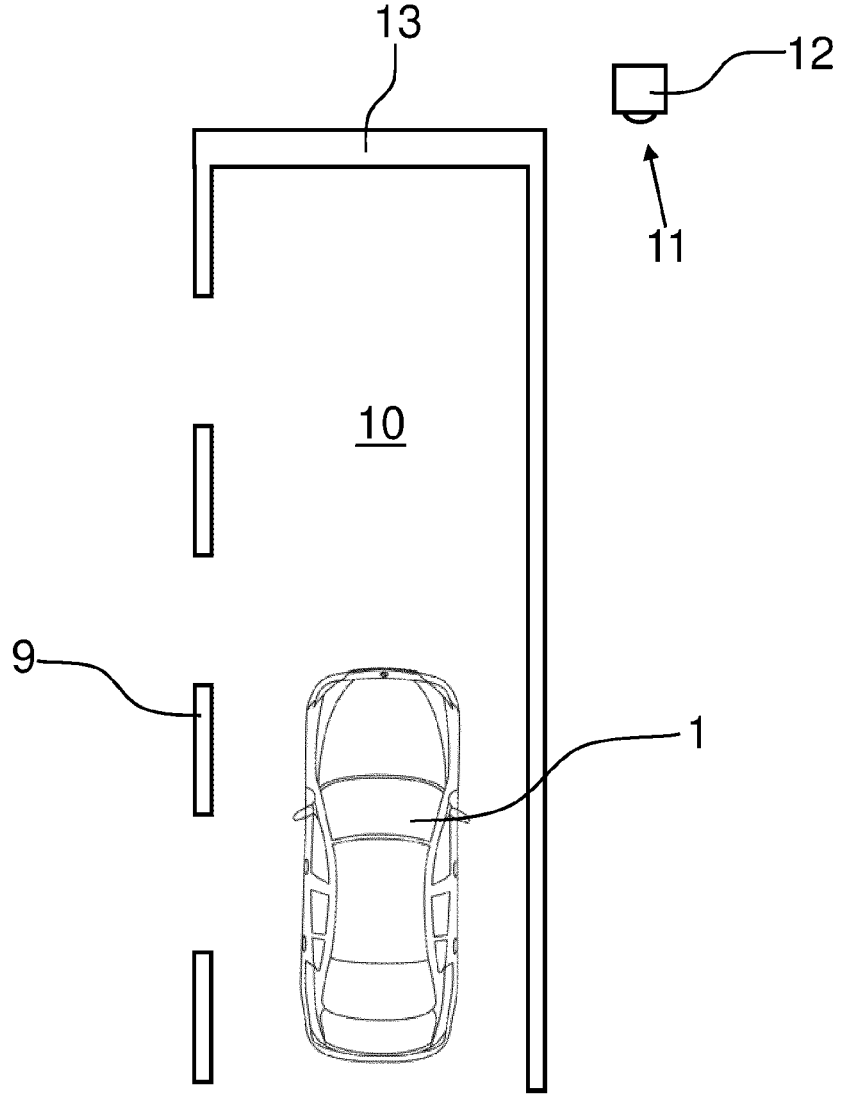
FIG. 2 shows a schematic illustration of a traffic situation in which the vehicle is maneuvered in a partially automated manner by way of the driver assistance system.

FIG. 2 shows a schematic illustration of a traffic situation. The vehicle 1 is maneuvered in a partially automated manner by way of the driver assistance system 2 here. During the maneuvering of the vehicle 1, objects in the surroundings 5 are able to be recognized based on the surroundings data from the surroundings sensor 4 or the image data from the camera by way of the computing apparatus 6. Road markings 9 may also be recognized based on the image data. On the basis of the recognized road markings 9, the transverse guidance of the vehicle 1 may then be regulated by way of the driving function apparatus 3, such that the vehicle 1 is maneuvered centrally in a road 10.

Furthermore, in the present case, a light signal 11 from a light signal installation 12 or a traffic light may be recognized on the basis of the surroundings data or the image data. It may thus also be recognized, by way of the computing apparatus 6, on the basis of the image data, whether a red, amber or green light signal is output by the traffic light. In the present example, a red light signal 11 is currently being output by the light signal installation 12. In this case, a partially automated driving maneuver may be performed by way of the driver assistance system 2, in which driving maneuver the longitudinal acceleration of the vehicle 1 is regulated on the basis of the light signal 11 and the vehicle 1 is braked such that it comes to a standstill before a stop line 13.

However, in this case, the situation arises whereby this partially automated driving maneuver, in which the red traffic light is recognized and the vehicle 1 is stopped automatically before the stop line 13, has already been performed multiple times before. This may be the case for example when the vehicle 1 has traveled this route multiple times on the daily commute. If this partially automated driving maneuver has been performed multiple times with high performance by the driver assistance system 2 in accordance with Level 2, the driver may, in rare cases, develop a significant degree of trust in automation. This may mean that the driver may trust the driver assistance system 2 and may not give the required attention to the driving maneuver.

To counter this aspect, provision is made here, following a predetermined number of performed partially automated driving maneuvers, for driver moderation to be requested for the following partially automated driving maneuver that is able to be performed. Provision is made for this in particular when a predetermined number of the same performed partially automated driving maneuvers is reached. The number after which the driver moderation is requested may be determined depending on the complexity and/or criticality of the partially automated driving maneuver. The driving maneuver described here, in which the vehicle 1 is maneuvered in a partially automated manner depending on the light signal 11, may be assumed to be safety-critical. The predetermined number may therefore be selected to be lower in comparison with less critical driving maneuvers. Furthermore, the performance of the driver assistance system 2 when performing previous similar or identical driving maneuvers may be taken into consideration when determining the number. The number may furthermore be determined on the basis of a risk profile of the driver and/or the attentiveness of the driver. As an alternative or in addition, provision may be made for the number to be determined by way of a random number generator.

If the predetermined number of partially automated driving maneuvers already performed is reached, the driver moderation may be requested for the following partially automated driving maneuver—that is to say recognizing the red light signal 11 and automatically stopping before the stop line. For this purpose, a moderation signal may be emitted by way of the computing apparatus 6 and feedback may be requested from the driver regarding the following partially automated driving maneuver by way of the output apparatus 7. The driver may in this case be asked for an operator input. This operator input may be performed on a control element or by touching one of the pedals of the vehicle 1. The operator input may be detected by way of the input apparatus 8. If the operator input has been performed by the driver, the partially automated driving maneuver may be performed by way of the driver assistance system 2 following this. As an alternative thereto, provision may be made for the driver to be asked to perform the following driving maneuver himself or to perform it manually.

This driver moderation makes it possible to prevent the driver building up a significant degree of trust in automation even in the case of high performance of the driver assistance system 2 following a plurality of successively performed partially automated driving maneuvers. The described method may also be used for other partially automated driving maneuvers. The method may in principle be used for partially automated functions that are performed by the driver assistance system 2. Such partially automated functions may, in addition to the partially automated driving maneuvers described above, also be the provision of information by way of the information system 7 and/or the outputting of a signal to the surroundings 5 by way of the signaling apparatus 14.

The invention claimed is:

1. A method for operating a driver assistance system of a vehicle, comprising:
   performing a plurality of partially automated functions using the driver assistance system during operation of the vehicle, wherein
   in the partially automated functions:
   longitudinal guidance and/or transverse guidance of the vehicle are and/or is regulated, and/or
   information that describes surroundings of the vehicle is output and/or a signal is output to the surroundings using the driver assistance system; and
   based on a determination that similar partially automated functions have been performed a predetermined number of times, a moderation signal is output to a driver of the vehicle for a following function that can be performed in a partially automated manner using the driver assistance system, wherein
   when the moderation signal is output, the driver is asked for feedback regarding the following function,
   when the moderation signal is output, the driver is asked for confirmation for the following function to be performed in a partially automated manner by the driver assistance system, and
   the predetermined number is based on a previously determined risk profile of the driver.

2. The method according to claim 1, further comprising:
   when the moderation signal is output, the driver is asked to perform the following function manually.

3. The method according to claim 1, wherein
   the predetermined number is also based on complexity and/or criticality of the following function.

4. The method according to claim 1, wherein
   the predetermined number is also based on a performance of the driver assistance system.

5. The method according to claim 1, wherein
   the moderation signal is output if:
   the predetermined number of similar partially automated functions has been performed, and/or
   the partially automated functions have been performed on a same route section.

6. The method according to claim 1, wherein the confirmation from the driver includes one of activating an operator input on a control element in a passenger compartment of the vehicle, tapping a brake pedal, a voice input, and a gesture input.

7. A driver assistance system for a vehicle comprising:
   a processor; and
   a memory in communication with the processor, the memory storing a plurality of instructions executable by the processor to configure the driver assistance system to perform the method of claim 1.

8. A vehicle comprising the driver assistance system of claim 7.

* * * * *